(12) United States Patent
Fujii et al.

(10) Patent No.: US 12,240,052 B2
(45) Date of Patent: Mar. 4, 2025

(54) FRICTION PRESSURE WELDING METHOD

(71) Applicant: OSAKA UNIVERSITY, Osaka (JP)

(72) Inventors: Hidetoshi Fujii, Osaka (JP); Huihong Liu, Osaka (JP); Yoshiaki Morisada, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 25 days.

(21) Appl. No.: 18/028,000

(22) PCT Filed: Sep. 1, 2021

(86) PCT No.: PCT/JP2021/032079
§ 371 (c)(1),
(2) Date: Mar. 23, 2023

(87) PCT Pub. No.: WO2022/064980
PCT Pub. Date: Mar. 31, 2022

(65) Prior Publication Data
US 2023/0339039 A1    Oct. 26, 2023

(30) Foreign Application Priority Data
Sep. 25, 2020    (JP) .................................. 2020-160467

(51) Int. Cl.
*B23K 20/12*    (2006.01)
*B23K 103/24*    (2006.01)

(52) U.S. Cl.
CPC .......... *B23K 20/12* (2013.01); *B23K 2103/24* (2018.08)

(58) Field of Classification Search
CPC ...... B23K 20/12–1215; B23K 2103/24; B23K 2103/02–06; B23K 2103/14
(Continued)

(56) References Cited

U.S. PATENT DOCUMENTS

| 3,134,278 A | * | 5/1964 | Hollander | .............. | B23K 20/12 |
| | | | | | 228/114.5 |
| 3,234,645 A | * | 2/1966 | Hollander | .............. | B23K 20/12 |
| | | | | | 228/113 |

(Continued)

FOREIGN PATENT DOCUMENTS

| CN | 108907445 A | * | 11/2018 | ............. | B23K 20/12 |
| CN | 110430962 A | * | 11/2019 | ............. | B23K 20/12 |

(Continued)

*Primary Examiner* — Kiley S Stoner
(74) *Attorney, Agent, or Firm* — RANKIN, HILL & CLARK LLP

(57) ABSTRACT

The objective of the present invention is to provide a friction pressure welding method with which the welding temperature can be controlled accurately, the welding temperature can be lowered, and the distribution of the welding temperature at an interface to be welded can be made uniform; and to provide a welded structure obtained by this method. The present invention relates to the friction pressure welding method in which one member is abutted against another member and is made to slide in a state in which a welding pressure substantially perpendicular to the interface to be welded is applied, said friction pressure welding method being characterized in that the maximum sliding speed is no greater than 53 mm/sec, the difference in the temperature increase rate between a center portion and an outer peripheral portion at the interface to be welded is 10° C./sec or less, and the difference between the maximum attained temperature between the center portion and the outer peripheral portion at the interface to be welded is no greater than 50° C.

11 Claims, 23 Drawing Sheets

(58) Field of Classification Search
USPC ..... 228/112.1–114.5, 2.1–2.3, 262.4–262.41, 228/262.71
See application file for complete search history.

(56) References Cited

U.S. PATENT DOCUMENTS

| | | | | | |
|---|---|---|---|---|---|
| 3,234,646 | A | * | 2/1966 | Hollander | B23K 20/12 228/113 |
| 3,234,647 | A | * | 2/1966 | Hollander | B23K 20/12 228/113 |
| 3,235,162 | A | * | 2/1966 | Hollander | B23K 20/12 228/199 |
| 3,269,002 | A | * | 8/1966 | Hollander | B23K 20/12 228/113 |
| 3,269,003 | A | * | 8/1966 | Hollander | B23K 20/12 228/114.5 |
| 3,406,890 | A | * | 10/1968 | Korte | B23K 20/12 228/2.3 |
| 3,435,509 | A | * | 4/1969 | Hollander | B23K 20/12 228/262.71 |
| 3,464,616 | A | * | 9/1969 | Stamm | B23K 20/121 228/2.3 |
| 3,473,214 | A | * | 10/1969 | Hollander | B23K 20/129 228/262.71 |
| 3,753,286 | A | * | 8/1973 | Lilly | B23K 20/129 228/112.1 |
| 4,063,676 | A | * | 12/1977 | Lilly | B29C 37/04 228/2.1 |
| 4,998,663 | A | * | 3/1991 | Cakmak | B23K 20/12 228/103 |
| 5,562,242 | A | * | 10/1996 | Manzo | B06B 1/045 228/2.1 |
| 2002/0036225 | A1 | * | 3/2002 | Foster | B23K 20/12 228/2.1 |
| 2017/0246707 | A1 | * | 8/2017 | Bray | B23K 20/1225 |
| 2018/0214974 | A1 | * | 8/2018 | Fujii | F16B 5/08 |
| 2018/0298947 | A1 | * | 10/2018 | Farthing | C22C 38/44 |

FOREIGN PATENT DOCUMENTS

| | | | | | |
|---|---|---|---|---|---|
| CN | 108608107 | B | * | 2/2020 | B23K 20/12 |
| CN | 110977137 | A | * | 4/2020 | B23K 20/122 |
| CN | 111886106 | A | * | 11/2020 | B23K 20/02 |
| JP | 2002178167 | A | * | 6/2002 | B23K 13/00 |
| JP | WO2008120428 | A1 | * | 7/2010 | |
| WO | WO-2017022184 | A1 | * | 2/2017 | B23K 20/12 |
| WO | WO-2018168687 | A1 | * | 9/2018 | B23K 20/12 |
| WO | WO-2019013287 | A1 | * | 1/2019 | B23K 20/12 |

* cited by examiner

FRICTION PRESSURE WELDING METHOD

TECHNICAL FIELD

The present invention relates to a friction welding method for metal materials, and more specifically to a friction welding method capable of accurately controlling a welding temperature and a welded structure obtained by the method.

BACKGROUND ART

Recently, a solid phase bonding (friction bonding) method where heat generation phenomenon due to friction is utilized has been paid attention as a bonding method which can lower reduction of strength at a bonded part in comparison with the conventional melt welding methods. As the solid bonding methods, examples include "friction stir welding (FSW)" where the bonding is achieved by pressing a columnar tool which rotates at a high speed into a member to be welded, and "friction welding" where the bonding is achieved by contacting a rotating columnar member to be welded with a member to be welded which is fixed, and the like.

Kinds and combinations of the members to be welded which are aimed to the friction welding where no tool is used include many cases, and with respect to steels which are usual structural members, intensive study has been done. For example, Patent Document 1 (JP2001-287051A) proposes a method which provides a friction welding joint of high tensile steel whose hardness becomes almost uniform over the direction of the radius of rotation of the friction welding.

The friction welding joint of high tensile steel described in Patent Document 1 is a friction welding joint of high tensile steel having a fine structure of a crystal grain diameter of 2 μm or below, a tensile strength of 60 kgf/mm$^2$ or above, and a carbon content of 0.1 wt % or below, and the carbon content of the high tensile steel is suppressed as low as 0.1 wt %. Due to the low carbon content of 0.1 wt % or below, when carrying out the friction welding, the structural change at peripheral portion of the high tensile steel can be suppressed to suppress the hardening.

The present inventors have also studied how to lower the welding temperature during friction welding and how to control the welding temperature, and have proposed, for example in Patent Document 2 (Japanese Republication No. 2017-022184), a friction welding method where surfaces to be welded of two metal members to be welded are made slide in contact with each other, wherein; at least one of the metal members to be welded is a ferrous material, and a maximum temperature reached during bonding is equal to or less than the $A_3$ point or equal to or less than the $A_{cm}$ point of the ferrous material.

In the friction welding method described in Patent Document 2, when the welding pressure applied substantially perpendicularly to the surfaces to be welded is set to 100 to 300 MPa, and the maximum sliding speed of the metal members to be welded is set to 75 to 380 mm/sec, the highest temperature reached during bonding can be set to the $A_3$ point or less or the $A_{cm}$ point or less of the iron-based member.

PRIOR ART REFERENCE

Patent Reference

Patent Reference 1: JP2001-287051A
Patent Reference 2: Japanese Republication No. 2017-022184

SUMMARY OF THE INVENTION

Problem to be Solved by the Invention

One of the advantages of friction welding which is a solid phase bonding, is that the welding temperature is lower than that of melt welding, and thus, there are expected to suppress the lowering of the joint strength caused by softening of the thermally affected portion in the bonded portion, and in case of dissimilar material bonding, to suppress the formation of a brittle intermetallic compound layer.

On the other hand, the Patent Document 1 discloses a friction welded joint made of high tensile steel member whose hardness is substantially uniform in the direction of the rotational radial of friction welding, but, since it is necessary that the carbon content of the high tensile steel is 0.1 wt % or less, the members to be welded is restricted to the extremely narrow range.

Further, in the friction welding method disclosed in Patent Document 2, though the friction welding temperature can be effectively reduced, the uniformity of the welding temperature at the interface to be welded is not taken into consideration. In friction welding, since the peripheral speed is different between the center portion and the outer peripheral portion of the interface to be welded, non-uniform temperature distribution is basically unavoidable. The non-uniform welding temperature distribution at the interface to be welded is a very serious problem in dissimilar metal bonding, in which the joint strength is greatly affected by the state of the intermetallic compound layer formed at the welded interface.

In view of the problems in the prior art as described above, an object of the present invention is to provide a friction welding method in which the welding temperature can be controlled accurately, the welding temperature can be lowered, and in addition, the distribution of the welding temperature at an interface to be welded can be made uniform, and to provide a welded structure obtained by this method.

Means to Solve the Problems

In order to achieve the above object, the present inventors have made intensive study on friction welding conditions, and as a result, have found that by lowering the maximum sliding speed during friction welding below a certain value, the temperature rising rate and temperature distribution at the center and outer peripheral portions of the interface to be welded can be controlled to the same degree, and have reached the present invention.

Namely, the present invention provides a friction welding method wherein one member is abutted against the other member and is made to slide in a state in which a welding pressure substantially perpendicular to the interface to be welded is applied, the friction welding method, characterized in that:

the maximum sliding speed is 53 mm/sec or less, the difference in the temperature rising rate between a center portion and an outer peripheral portion at the interface to be welded is within 10° C./sec, and the difference between the maximum attained temperatures of the center portion and the outer peripheral portion at the interface to be welded is within 50° C.

During friction welding, the sliding speed is highest at the outer periphery of the member to be welded, and the fact that heat generation at the outer periphery is greater than at the center is considered to be the main cause of the non-uniform welding temperature. From this point of view, as the result of examining various friction welding conditions in order to make the temperature distribution of the interface to be welded during the welding process uniform, by setting the maximum sliding speed (sliding speed of the outermost periphery of the member to be welded) to 53 mm/sec, it has been clear that the difference in the temperature rising rate between the center portion and the outer peripheral portion of the interface to be welded becomes within 10° C./sec, and as a result, the difference between the maximum attained temperatures of the center portion and the outer peripheral portion of the interface to be welded is within 50° C. Here, it is preferable that the difference in the temperature rising rate between the center portion and the outer peripheral portion of the interface to be welded is within 5° C./sec.

Further, in the friction welding method of the present invention, it is preferable that the maximum sliding speed is 21 mm/sec or less. By setting the maximum sliding speed to 21 mm/sec or less, the difference in temperature rising rate between the center portion and the outer peripheral portion of the interface to be welded becomes within 10° C./sec, and in addition, the temperature rising rate can be set to a lower value, which can make the temperature distribution at the interface to be welded more uniform and lower. Here, the lower limit of the maximum sliding speed is not particularly limited, and may be set to a value that suppresses the formation of defects and unwelded portions due to insufficient heat generation.

Further, in the friction welding method of the present invention, it is preferable that the welding pressure is set to be more than 300 MPa and the yield stresses of the one member and the other member at room temperature or less. Further, it is more preferable to set the welding pressure to 400 MPa or more. The welding temperature in the friction welding can be lowered by increasing the welding pressure. That is, by using a high pressure of more than 300 MPa or 400 MPa or more, which is not used in general friction welding, the welding temperature can be lowered. On the other hand, by applying the high pressure at a low welding temperature, a large amount of strain is introduced in the vicinity of the interface to be welded, and a strong welded portion can be formed through recrystallization. The reason why the welding pressure is set to the yield stress of the member to be welded or less is to suppress buckling during the welding process.

Moreover, in the friction welding method of the present invention, it is preferable that the one member and the other member have different compositions. When the members to be welded have different compositions, the reaction between one member and the other member at the interface to be welded becomes a problem. In particular, when a fragile intermetallic compound layer is formed thickly at the interface to be welded, the mechanical properties of the joint are significantly deteriorated. On the other hand, according to the friction welding method of the present invention, in addition to controlling the welding temperature to be low, since the difference in maximum attained temperature between the center portion and the outer peripheral portion of the interface to be welded is within 50° C., even when an intermetallic compound layer is formed, a uniform and thin intermetallic compound layer is formed over the entire welded interface.

Further, in the friction welding method of the present invention, it is preferable that, when the defects are formed at the interface to be welded, the welding pressure is reduced, and when the intermetallic compound layer having a thickness of 1 μm or more is formed at the interface to be welded and/or when the heat affected zone where the hardness is reduced by 10% or more compared to the base material is formed, the welding pressure is increased.

By reducing the welding pressure, the welding temperature can be increased to improve the material fluidity in the vicinity of the interface to be welded, and thereby it is possible to suppress the defects. On the other hand, by increasing the welding pressure, the welding temperature can be lowered, it is possible to suppress the formation of the intermetallic compound layer having a thickness of 1 μm or more and the formation of the heat affected zone where the hardness is reduced by 10% or more compared to the base material.

Further, in the friction welding method of the present invention, it is preferable that the diameter of the interface to be welded is 50 mm or less. More preferable diameter of the interface to be welded is 30 mm or less, and the most preferable diameter of the interface to be welded is 10 mm or less. By setting the diameter to these values, it is possible to achieve the uniformity of the welding temperature and the suppression of defects and unwelded portions more reliably and simultaneously.

Furthermore, in the friction welding method of the present invention, it is preferable that the one member is a titanium alloy material and the other member is a steel material. In dissimilar material welding of a titanium alloy material and a steel material, since a fragile intermetallic compound layer is easily formed at the welded interface, it is difficult to control the film thickness of the intermetallic compound layer, but by using the friction welding method of the present invention, it is possible to obtain a defect-free and mixed layer-free welded portion where an extremely thin and uniform intermetallic compound layer is formed over the entire welded interface.

Further, the present invention also provides a welded structure having the friction welded portions of one member and the other member, characterized in that
    the one member and the other member have different compositions,
    the thickness of the intermetallic compound layer formed at the welded interface of the friction welded portion is 1 μm or less,
    the thickness (Tp) of the intermetallic compound of the outer peripheral portion in the welded interface and the thickness (Tc) of the intermetallic compound of the center portion in the welded interface are $0.8Tc \leq Tp \leq 1.2Tc$, and
    a mixed layer composed of the one member and the other member is not formed at the welded interface.

The welded structure of the present invention has a friction welded portion, and is most characterized in that the thin and uniform intermetallic compound layer is formed over the entire welded interface of the friction welded portion. Further, the "mixed layer", which is a serious problem in the friction welding of dissimilar materials, is completely suppressed.

The thickness (Tp) of the intermetallic compound of the outer peripheral portion in the welded interface and the thickness (Tc) of the intermetallic compound of the center portion in the welded interface are $0.8Tc \leq Tp \leq 1.2Tc$. Here, it is preferable that $0.9Tc \leq Tp \leq 1.1Tc$, and more preferably $0.95Tc \leq Tp \leq 1.05Tc$.

In the welded structure of the present invention, it is preferable that the diameter of the welded interface is 10 to 50 mm. When the diameter of the interface to be welded is 10 to 50 mm, the intermetallic compound satisfies $0.8Tc \leq Tp \leq 1.2Tc$, and in addition, the formation of defects and unwelded portions are sufficiently suppressed.

Further, in the welded structure of the present invention, it is preferable that the one member is a titanium alloy material and the other member is a steel material. In dissimilar material welding of a titanium alloy material and a steel material, since a fragile intermetallic compound layer is easily formed at the welded interface, it is difficult to control the film thickness of the intermetallic compound layer, but in the welded structure of the present invention, the extremely thin and uniform intermetallic compound layer is formed over the entire welded interface, and the defect-free and mixed layer-free welded portion is formed.

Effects of the Invention

According to the present invention, it is possible to provide a friction welding method in which the welding temperature can be controlled accurately, the welding temperature can be lowered, and in addition, the distribution of the welding temperature at an interface to be welded can be made uniform, and to provide a welded structure obtained by this method.

MODE FOR CARRYING OUT THE INVENTION

In the following, by referring the drawings, as the typical embodiments of the dissimilar material solid phase bonding method and the dissimilar material bonding structure of the present invention, the linear friction welding is explained as a typical case, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(1) Friction Welding Method

Figure 1:
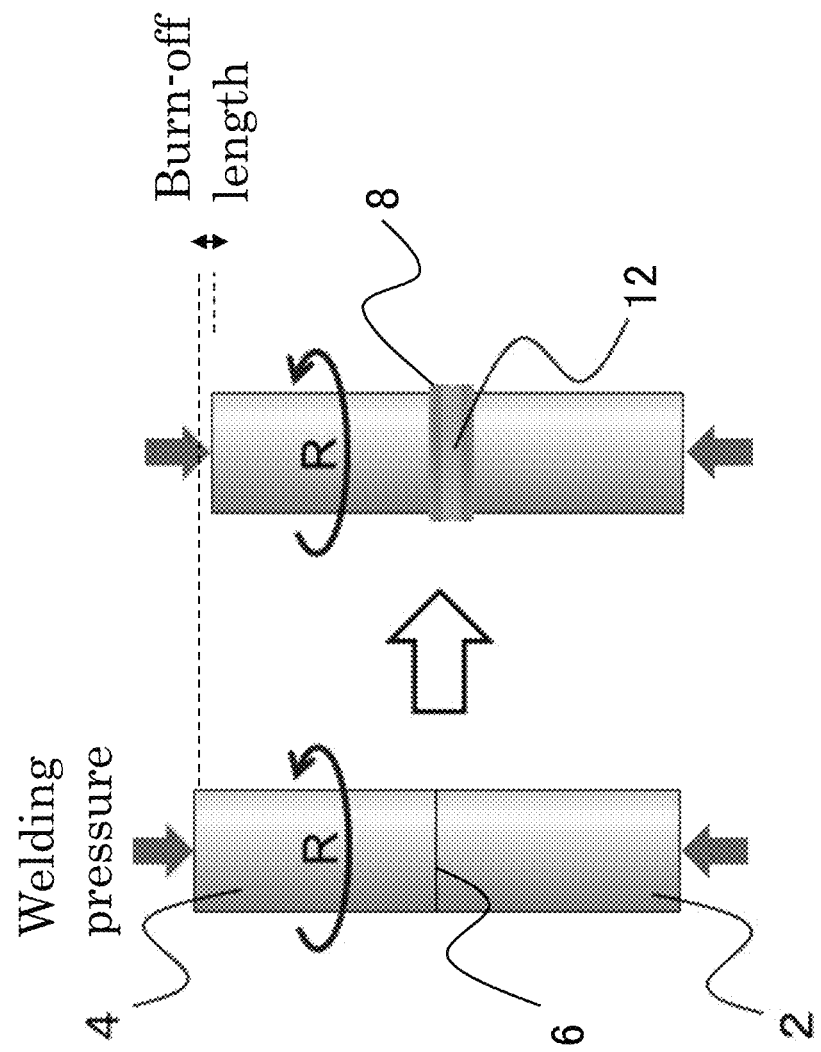
FIG. 1 is a schematic diagram showing the welding steps of the friction welding of the present invention.

FIG. 1 is a schematic diagram showing the welding steps of the friction welding of the present invention. The friction welding method of the present invention is a friction welding method wherein one member 2 is abutted against the other member 4 and is made to rotationally slide in a state in which a welding pressure substantially perpendicular to the interface 6 to be welded is applied.

Figure 2:
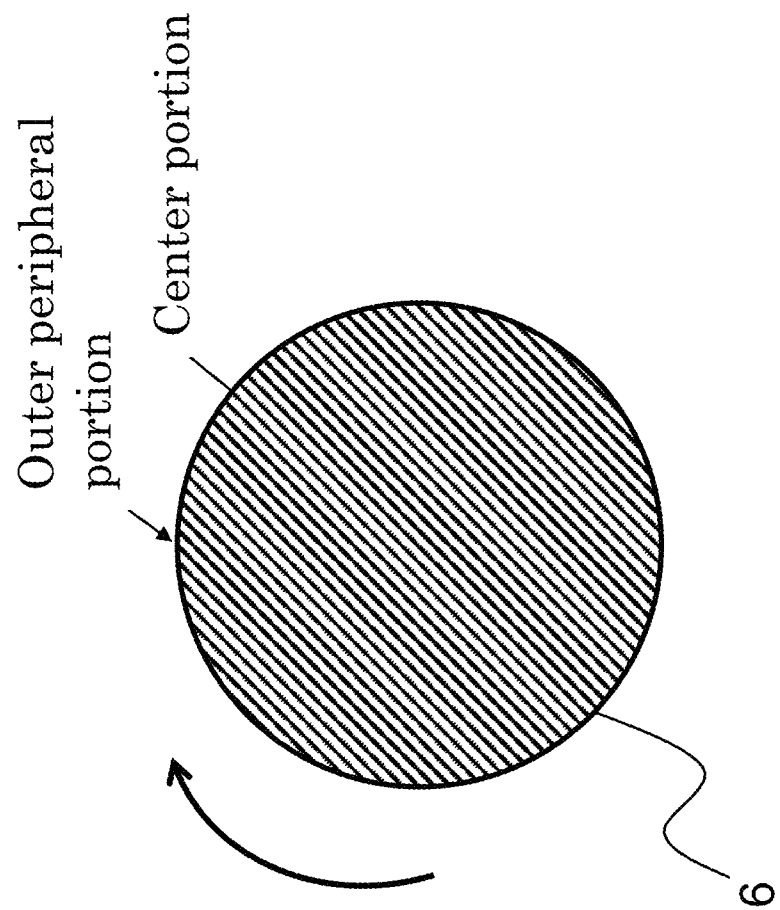
FIG. 2 is a schematic diagram of the interface 6 to be welded.

FIG. 2 shows a schematic diagram of the interface 6 to be welded. In the friction welding, the one member 2 and/or the other member 4 are rotated, and the case where the interface 6 to be welded is rotating will be described. When the interface 6 to be welded rotates, strictly speaking, the center of the interface 6 to be welded does not have a sliding speed. On the other hand, since the peripheral speed increases as the radius of rotation increases, the highest sliding speed during friction welding is in the outer peripheral portion of the member to be welded. That is, basically, the welding temperature increases from the center portion toward the outer peripheral portion.

In the friction welding method of the present invention, by setting the maximum sliding speed at the outer peripheral portion to 53 mm/sec or less, the difference in temperature rising rate between the center portion and the outer peripheral portion of the interface 6 to be welded is within 5°

C./sec. Here, the method for measuring the temperature change between the center portion and the outer peripheral portion is not particularly limited as long as the effects of the present invention are not impaired, and various conventionally known temperature measuring methods can be used. For example, the temperature history can be measured by arranging thermocouples at the center portion and the outer peripheral portion directly below the interface 6 to be welded on the fixed side (the other member 4 in FIG. 1). As for the temperature of the outer peripheral portion, by obtaining the correlation between the value obtained by the radiation thermometer and the value obtained by the thermocouple is obtained, the value of the radiation thermometer may be corrected and used.

By setting the difference in temperature rising rate between the center portion and the outer peripheral portion of the interface 6 to be welded within 10° C./sec, it is possible to make the difference in maximum attained temperatures between the center portion and the outer peripheral portion of the interface 6 to be welded within 50° C. More preferable difference in temperature rising rate between the center portion and the outer peripheral portion of the interface 6 to be welded is within 5° C./sec. More specifically, since the time for which the interface 6 to be welded is held at a predetermined welding temperature in the friction welding is about several seconds, by setting the difference in temperature rising rate between the center portion and the outer peripheral portion should be within 10° C./sec (more preferably within 5° C./sec), it is possible to make the difference between the maximum attained temperatures at the center portion and the outer peripheral portion of the interface 6 to be welded within 50° C.

Further, by setting the maximum sliding speed to 21 mm/sec or less, the difference in temperature rising rate between the center portion and the outer peripheral portion of the interface 6 to be welded becomes within 10° C./sec, and in addition, the temperature rising rate can be set to a lower value, which can make the temperature distribution at the interface to be welded more uniform and lower. Although affected by the composition, size, and the like of the members to be welded, the temperature rising rate can be reduced to about half at the maximum sliding speed of 21 mm/sec as compared with the maximum sliding speed of 53 mm/sec. Here, the lower limit of the maximum sliding speed is not particularly limited, and may be set to a value that suppresses the formation of defects and unwelded portions due to insufficient heat generation.

When desiring to further lower the maximum attained temperature at the outer peripheral portion of the interface 6 to be welded, it may be used in combination of external cooling by blowing air or jetting liquid nitrogen, liquid $CO_2$, or the like. In this case, from the viewpoint of cooling efficiency, it is preferable to use the injection of liquid $CO_2$. Since $CO_2$ is a liquid state at 5 atmospheres or higher, it is considered that when the liquid $CO_2$ stored in the high-pressure tank is sprayed onto the outer peripheral portion of the interface 6 to be welded, it becomes a fine solid.

The welding pressure is preferably more than 300 MPa and the yield stresses of the one member 2 and the other member 4 at room temperature or less. More preferable welding pressure is 400 MPa or more. Although this principle has not been used in conventional friction welding, the welding temperature in the friction welding can be lowered by increasing the welding pressure.

As shown in FIG. 1, by repeatedly rotationally sliding the one member 2 and the other member 4 on the same locus a state while applying a pressure substantially perpendicular to the interface 6 to be welded to discharge the burr 8 from the interface 6 to be welded. Here, the burr 8 is discharged because the yield stress of the member to be welded at the welding temperature is lower than the welding pressure, and since the temperature dependence of the yield strength is primarily determined by the member to be welded, it is possible to control the welding temperature by the welding pressure.

Figure 3:
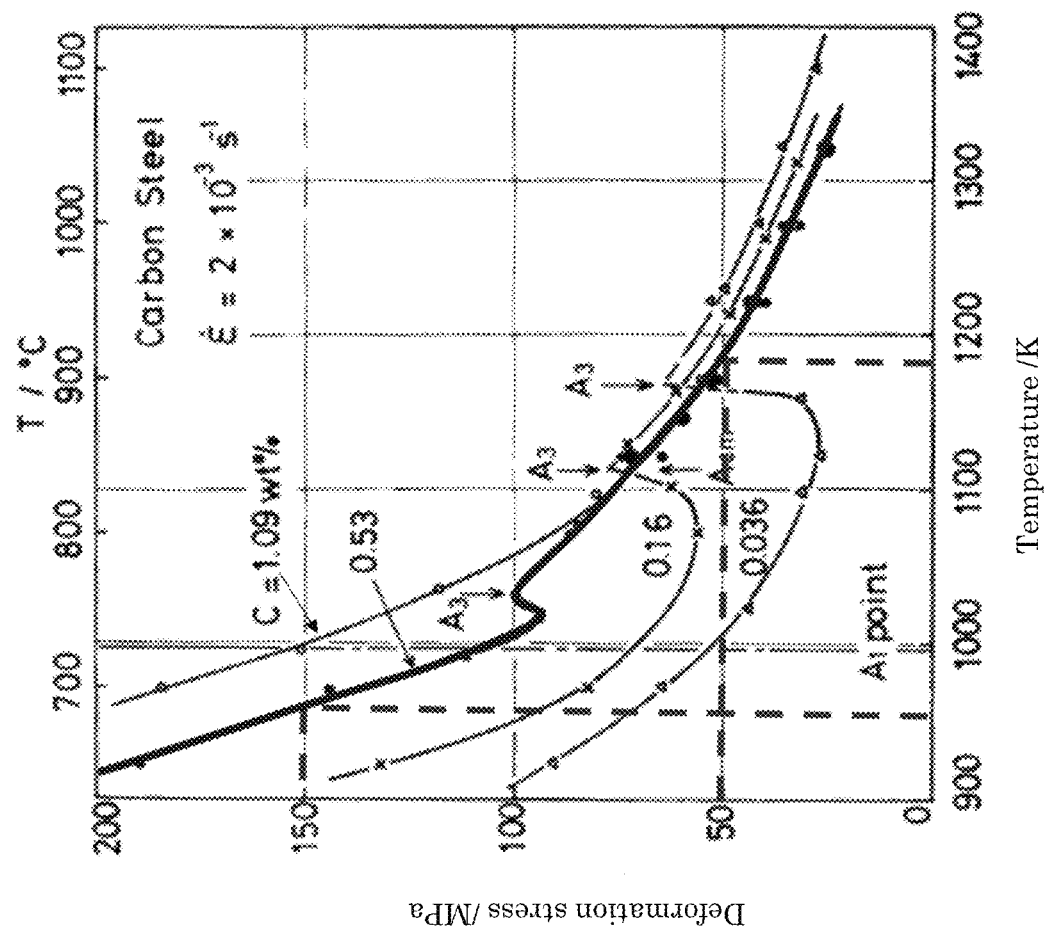
FIG. 3 is a graph showing the deformation stress (yield stress) of carbon steel in each temperature.
Figure 4:
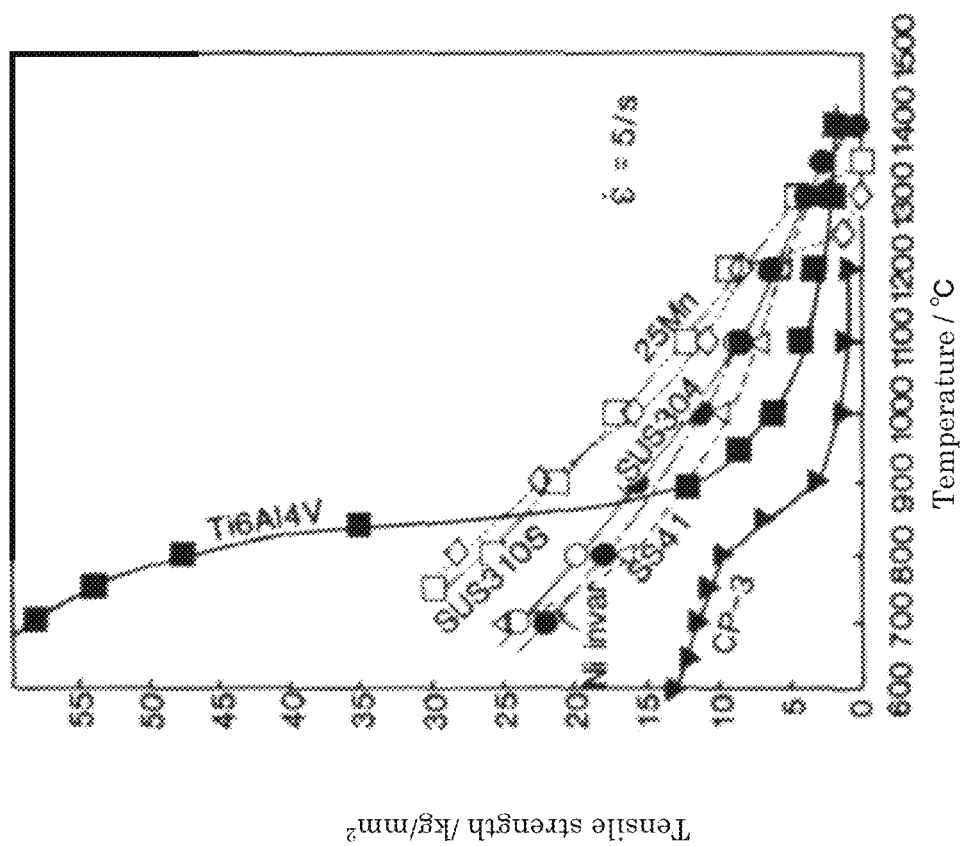
FIG. 4 is a graph showing the tensile strength of various metals in each temperature.

As a specific example, FIG. 3 shows the deformation stress (yield stress) of the carbon steel at each temperature, and FIG. 4 shows the tensile strength of various metals at each temperature. FIG. 3 is a graph published in "Iron and Steel, No. 11, the 67th year (1981), p. 140", and FIG. 4 is a graph published in "Iron and Steel, No. 6, the 72th year (1986), p. 55". As shown in these figures, the tensile strength and yield stress at a specific temperature are substantially constant depending on the material.

That is, when the welding pressure is set high, the material to be bonded having higher yield strength and tensile strength can be discharged as burrs 8, and the welding temperature can be lowered. Further, as shown in FIG. 3 and FIG. 4, since the tensile strength and the yield stress at a specific temperature are substantially constant depending on the material, the welding temperature can be controlled extremely accurately.

The materials of the one member 2 and the other member 4 are not particularly limited as long as they do not impair the effects of the present invention, and conventionally known various metal materials can be used, but preferably the one member 2 and the other member 4 have different compositions. When the members to be welded have different compositions, the reaction between one member and the other member at the interface to be welded becomes a problem, and in particular, when a fragile intermetallic compound layer is formed thickly at the interface to be welded, the mechanical properties of the joint are significantly deteriorated. On the other hand, according to the friction welding method of the present invention, in addition to controlling the welding temperature to be low, since the difference in maximum attained temperature between the center portion and the outer peripheral portion of the interface 6 to be welded is within 50° C., even when an intermetallic compound layer is formed, a uniform and thin intermetallic compound layer is formed over the entire welded interface. For example, even in the welding of a titanium alloy material and a steel material, where it is difficult to control the film thickness of the intermetallic compound layer, it is possible to obtain the defect-free welded portion where extremely thin and uniform intermetallic compound layer formed over the entire welded interface.

Further, the size of the one member 2 and the other member 4 is not particularly limited as long as the effects of the present invention are not impaired, but the diameter of the interface 6 to be welded is preferably 50 mm or less, more preferably 30 mm or less, most preferably 10 mm or less. By setting the diameter to these values, it is possible to achieve the uniformity of the welding temperature and the suppression of defects and unwelded portions more reliably.

Further, it is preferable that, when the defects are formed at the interface 6 to be welded, the welding pressure applied substantially perpendicularly to the interface 6 to be welded is reduced, and when the intermetallic compound layer having a thickness of 1 μm or more is formed at the interface 6 to be welded and/or when the heat affected zone where the hardness is reduced by 10% or more compared to the base material is formed, the welding pressure is increased.

By reducing the welding pressure, the welding temperature can be increased to improve the material fluidity in the vicinity of the interface 6 to be welded, and thereby it is possible to suppress the defects. On the other hand, by increasing the welding pressure, the welding temperature can be lowered, it is possible to suppress the formation of the intermetallic compound layer having a thickness of 1 μm or more and the formation of the heat affected zone where the hardness is reduced by 10% or more compared to the base material.

Either one of the one member 2 and the other member 4 may be rotated, or both may be rotated. Further, the one member 2 may be rotated before being brought into contact with the other member 4, or may be rotated after the interface 6 to be welded is formed. In either case, the maximum sliding speed is the relative speed between the one member 2 and the other member 4.

The welding parameters of the friction welding such as the burn-off length are not particularly limited as long as the effects of the present invention are not impaired, and may be appropriately set depending on the material, shape, size, and the like of the members to be welded.

(2) Welded Structure

Figure 5:
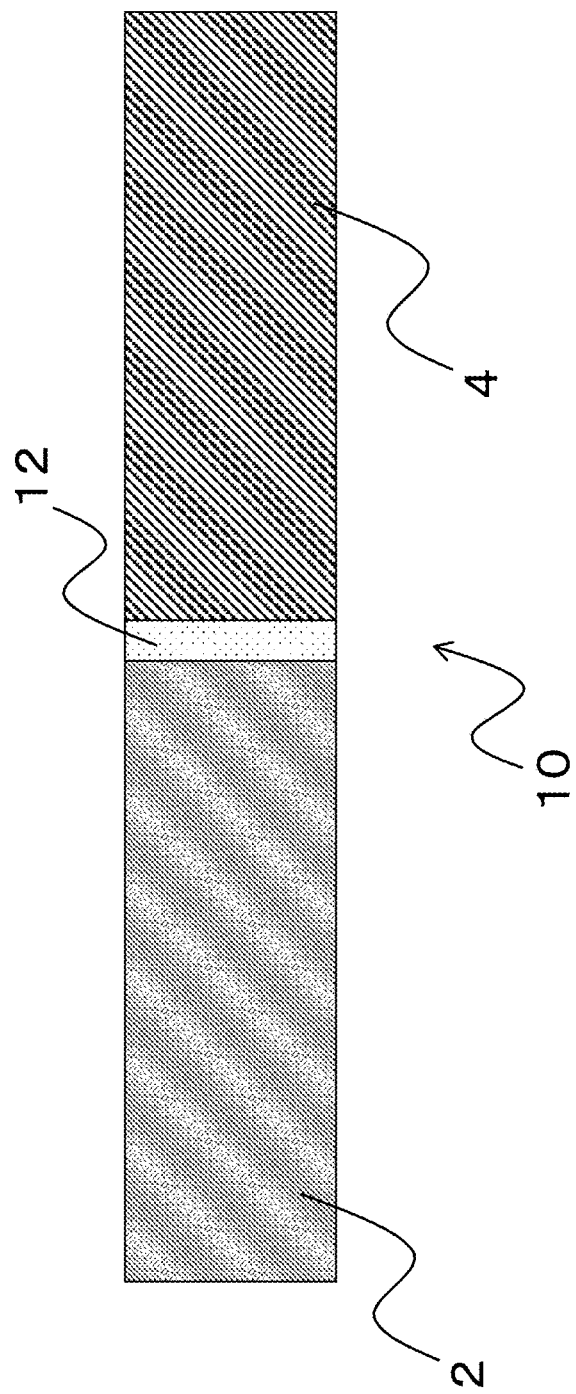
FIG. 5 is a schematic diagram showing the welded portion in the welded structure of the present invention.

FIG. 5 is the schematic diagram showing the welded portion in the welded structure of the present invention. The welded portion 10 is formed by the friction welding, and the one member 2 and the other member 4 are welded via the welded interface 12. The welded structure of the present invention can be suitably manufactured by the friction welding method of the present invention.

The one member 2 and the other member 4 have different compositions. For example, the one member 2 may be a steel member and the other member 4 may be a completely different metal member such as an aluminum member, or may be alloy members having the same main metal but different compositions.

The one member 2 and the other member 4 have different compositions, and these compositions are not particularly limited as long as the effects of the present invention are not impaired, and various conventionally known metal members can be used, and it is preferable that the one member 2 is a titanium alloy material and the other member 4 is a steel material. In dissimilar material welding of a titanium alloy material and a steel material, since a fragile intermetallic compound layer is easily formed at the welded interface 12, it is difficult to control the film thickness of the intermetallic compound layer, but in the welded portion 10, the extremely thin and uniform intermetallic compound layer is formed over the entire welded interface 12.

The thickness of the intermetallic compound layer formed at the welded interface 12 of the friction welded portion is 1 μm or less, and the thickness (Tp) of the intermetallic compound of the outer peripheral portion in the welded interface 12 and the thickness (Tc) of the intermetallic compound of the center portion in the welded interface are $0.8Tc \leq Tp \leq 1.2Tc$. Tp and Tc are preferably $0.9Tc \leq Tp \leq 1.1Tc$, and more preferably $0.95Tc \leq Tp \leq 1.05Tc$. By setting the thickness of the intermetallic compound layer at the welded interface 12 to 1 μm or less and reducing the variation in thickness, breakage of the welded portion from the intermetallic compound layer can be extremely effectively suppressed.

Further, any mixed layer composed of the one member 2 and the other member 4 is not formed on the welded interface 12. When the mixed layer exists in the welded interface 12, the region becomes the starting point of fracture, and the mechanical properties of the joint are greatly reduced, but, since the mixed layer is completely suppressed in the welded portion 10, the extremely highly reliable welded structure is realized.

The diameter of the welded interface 12 is preferably 10 to 50 mm. When the diameter of the welded interface 12 is 10 to 50 mm, it is possible to form a good welded interface 12 having a thin and uniform intermetallic compound layer by using the friction welding method of the present invention.

Although the typical embodiments of the friction welding method and the welded structure obtained by the method according to the present invention have been described above, the present invention is not limited to these, and various design changes are possible, and all of these design changes are included in the technical scope of the present invention.

Example

As members to be welded, a titanium alloy (Ti-6Al-4V) round bar and a stainless steel (SUS316L) round bar having a diameter of 10 mm were used. A friction welding machine available from Nitto Seiki Co., Ltd. was used as a welding apparatus, and friction welding was performed under each of welding conditions 1 to 5 shown in Table 1. The stainless steel round bar was fixed, and the titanium alloy round bar was rotated at the speed shown in Table 1 and pressed against the stainless steel round bar with the friction pressure shown in Table 1. A so-called upset process was not provided, and the welding process was terminated when the burn-off length of 4 mm was reached while the friction welding shown in Table 1 was applied.

TABLE 1

|  | Rotation speed (rpm) | Max sliding speed (mm/s) | Friction pressure (MPa) | Burn-off length (mm) |
| --- | --- | --- | --- | --- |
| Present welding condition 1 | 40 | 20.94 | 400 | 4 |
| Present welding condition 2 | 40 | 20.94 | 450 | 4 |
| Present welding condition 3 | 40 | 20.94 | 500 | 4 |
| Present welding condition 4 | 80 | 41.89 | 500 | 4 |
| Present welding condition 5 | 100 | 52.36 | 500 | 4 |
| Comparative welding condition 1 | 150 | 78.54 | 500 | 4 |
| Comparative welding condition 2 | 300 | 157.08 | 500 | 4 |

Comparative Example

Friction welding was performed in the same manner as in Example except that the welding conditions described as the comparative welding conditions 1 and the comparative welding condition 2 in Table 1 were used.

[Evaluation]

(1) Temperature History During Friction Welding

Figure 6:
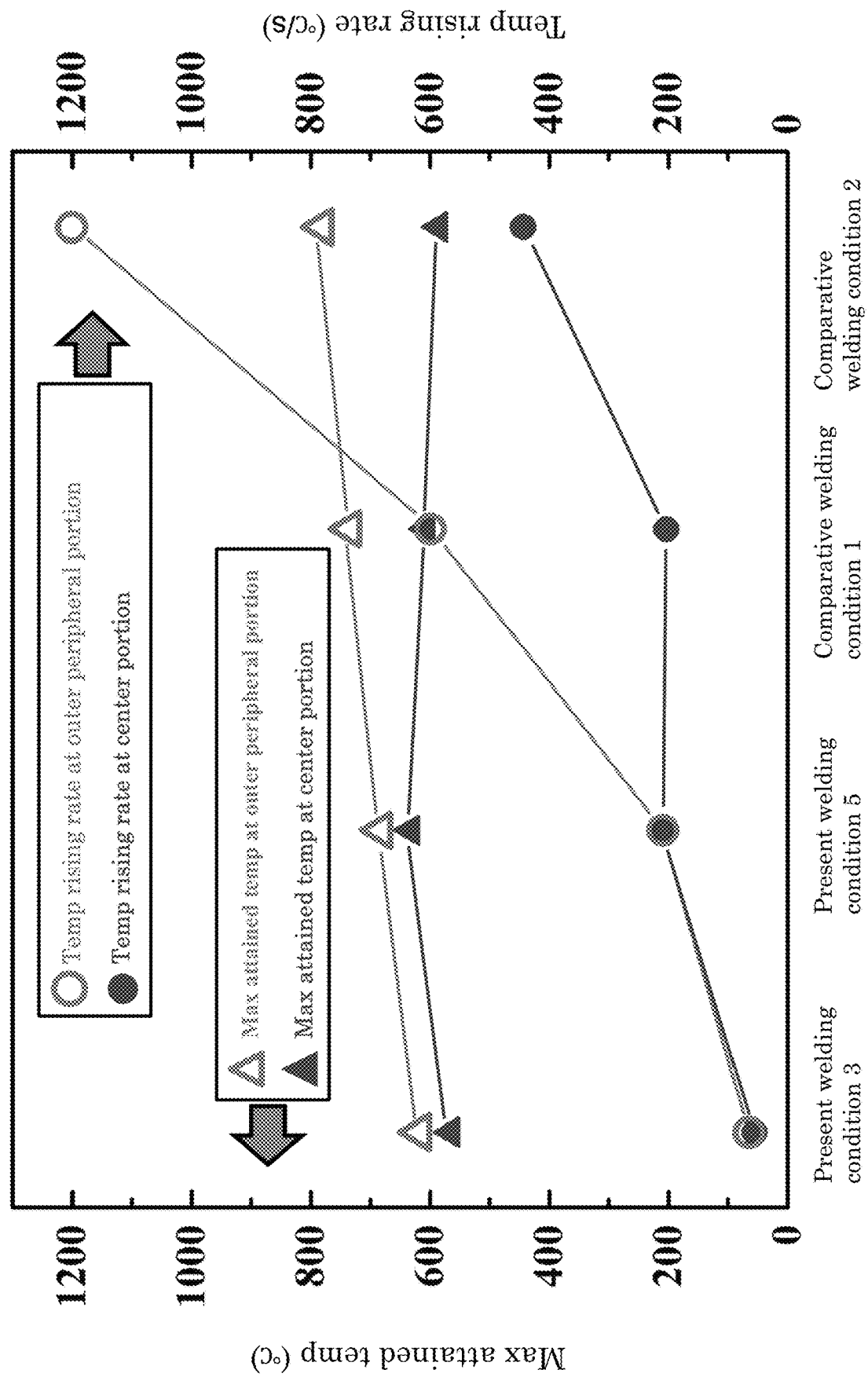
FIG. 6 is a graph showing the influence of the rotation speed (maximum sliding speed) which acts on the highest attained temperature and the temperature rising rate.

Regarding the present welding condition 3, the present welding condition 5, the comparative welding condition 1, and the comparative welding condition 2, the temperature histories of the center portion and the outer peripheral portion of the interface to be welded during the friction welding were measured. Specifically, the stainless steel round bar on the fixed side was provided with narrow holes, and K thermocouples were placed directly under the center portion and the outer peripheral portion of the interface to be welded to measure the temperature histories. FIG. 6 shows the relationship between the maximum attained temperature and the temperature rising rate during the welding, and the welding conditions. The temperature rising rate was obtained from the temperature change between 200 and 500° C.

The welding conditions shown in FIG. 6 are the same except for the rotation speed (maximum sliding speed), and the influence of the rotation speed (maximum sliding speed) on the maximum attained temperature and the temperature rising rate can be confirmed. First, focusing on the difference in temperature rising rate between the center and the outer periphery, the difference becomes smaller as the rotation speed (maximum sliding speed) decreases, and at 100 rpm (52.36 mm/s) or less, the temperature rising rate in the center portion and the outer peripheral portion are substantially the same.

Next, focusing on the maximum attained temperature at the center portion and the outer peripheral portion, the temperature difference between the center portion and the outer peripheral portion at 100 rpm (52.36 mm/s) or less is 50° C. or less. These results indicate that due to the reduction in the difference of the temperature rising rates between the center portion and the outer peripheral portion, the welding temperature distribution becomes uniform over the entire interface to be welded.

Figure 7:
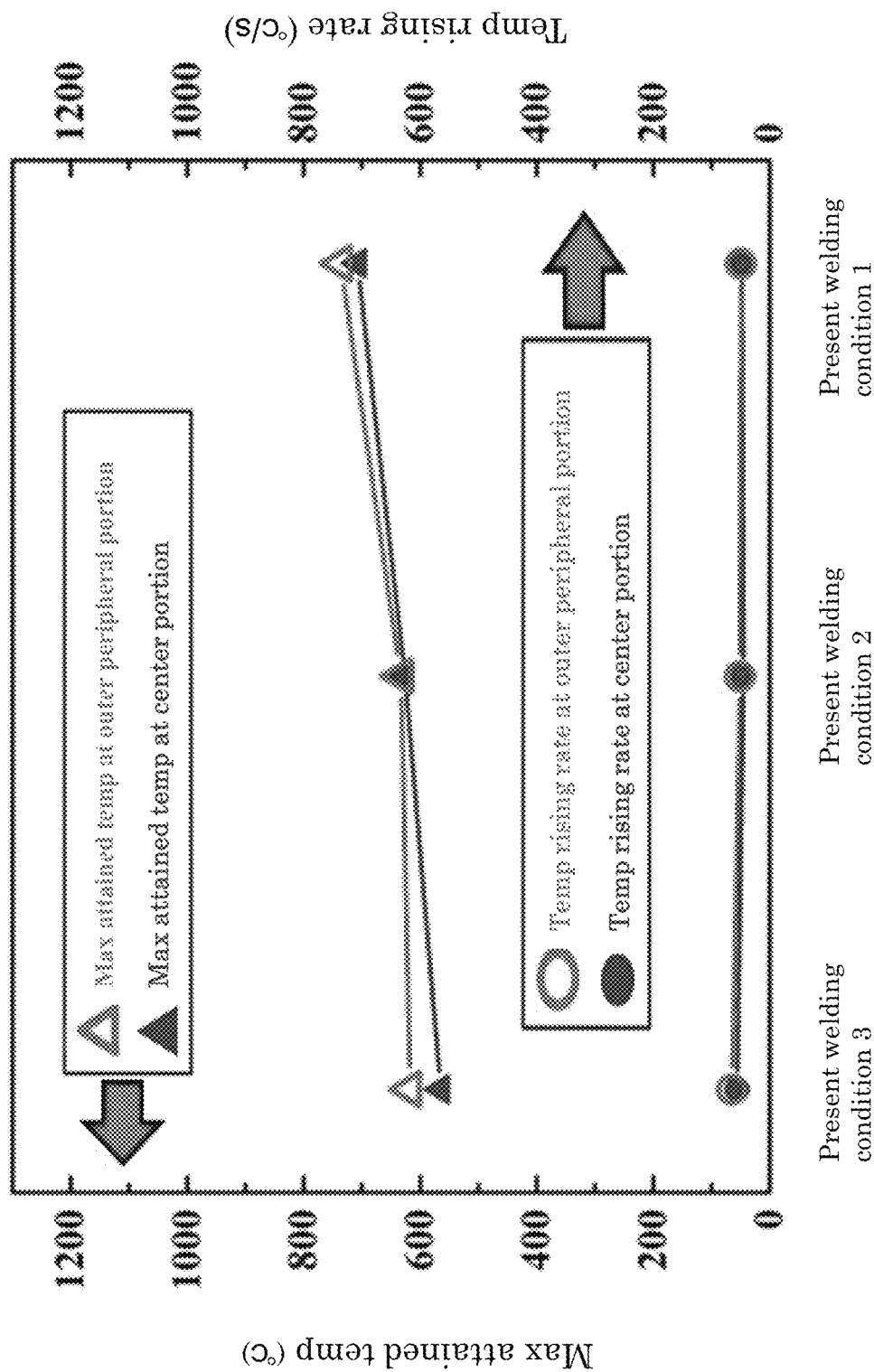
FIG. 7 is a graph showing the influence of the welding pressure which acts on the highest attained temperature and the temperature rising rate.

Further, regarding the present welding condition 1 to the present welding condition 3, the temperature histories of the center portion and the outer peripheral portion of the interface to be welded during the friction welding were measured. FIG. 7 shows the relationship between the maximum attained temperature and the temperature rising rate during the welding, and the welding conditions. The welding conditions shown in FIG. 7 are the same except for the welding pressure, and the influence of the welding pressure on the maximum attained temperature and the temperature rising rate can be confirmed.

From the results shown in FIG. 7, it can be seen that the temperature rising rate is not affected by the welding pressure. On the other hand, although the maximum attained temperature decreased due to the increase in the welding pressure, the maximum attained temperatures at the center portion and the outer peripheral portion were substantially the same under all conditions. These results show that the control of the rotational speed (maximum sliding speed) is extremely important for making the temperature distribution of the interface to be welded uniform.

(2) Cross-Sectional Observation of the Joint Interface

Figure 8:
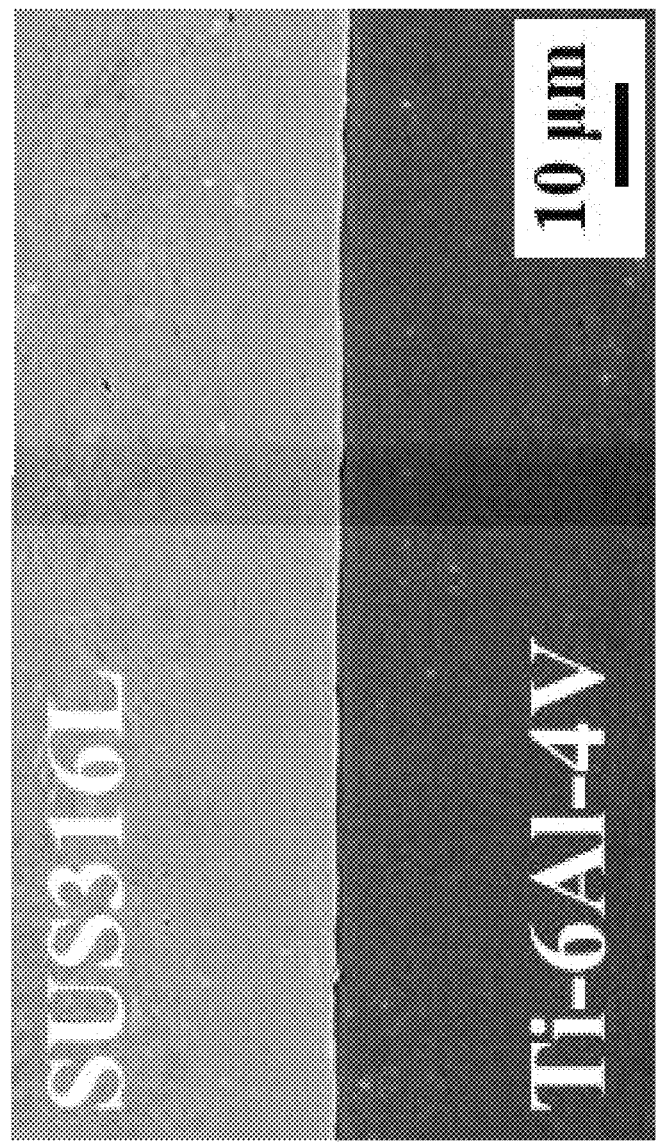
FIG. 8 is a SEM photograph of the center portion of the welded interface obtained under the present welding condition 2.
Figure 9:
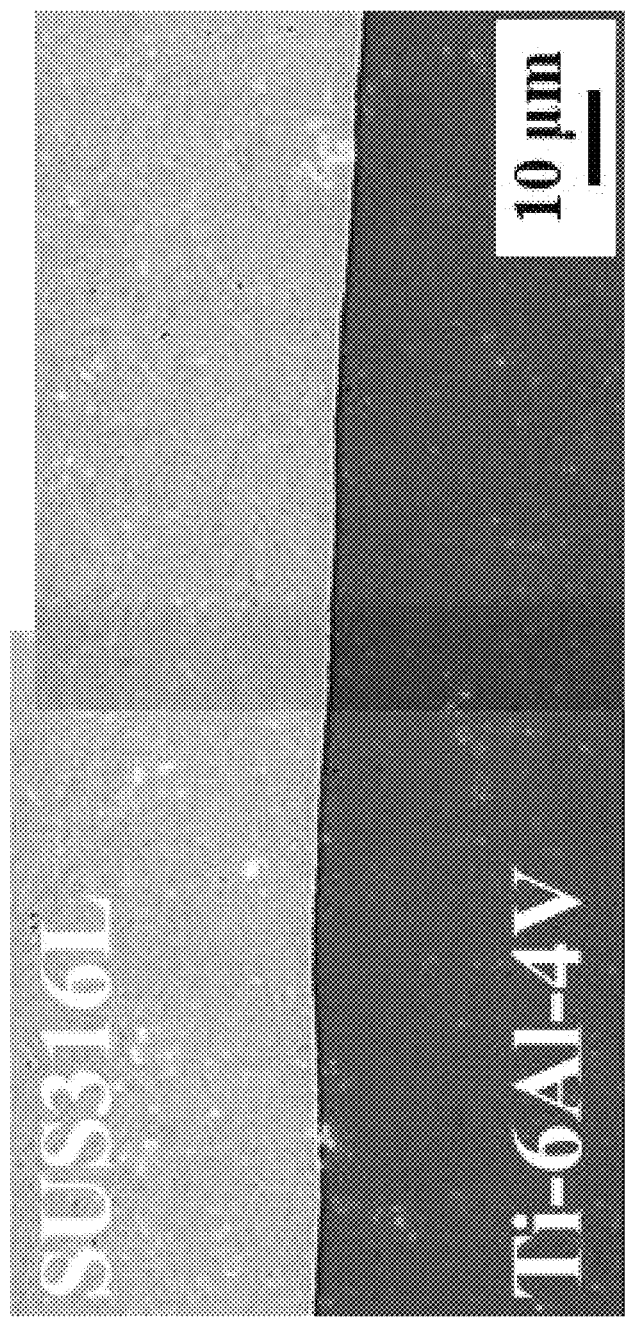
FIG. 9 is a SEM photograph of the outer peripheral portion of the welded interface obtained under the present welding condition 2.

In order to confirm the state of the welded interface, SEM observation of the sample of the cross-sectional welded portion was performed. FE-SEM (JSM-7001FA available from JEOL Ltd.) was used for the SEM observation. FIG. 8 and FIG. 9 show the center portion and the outer peripheral portion of the welded interface obtained under the present welding condition 2, respectively. No defect or mixed layer was observed in the center portion and the outer peripheral portion, and a good welded interface with an extremely thin intermetallic compound layer having substantially the same thickness was obtained.

Figure 10:
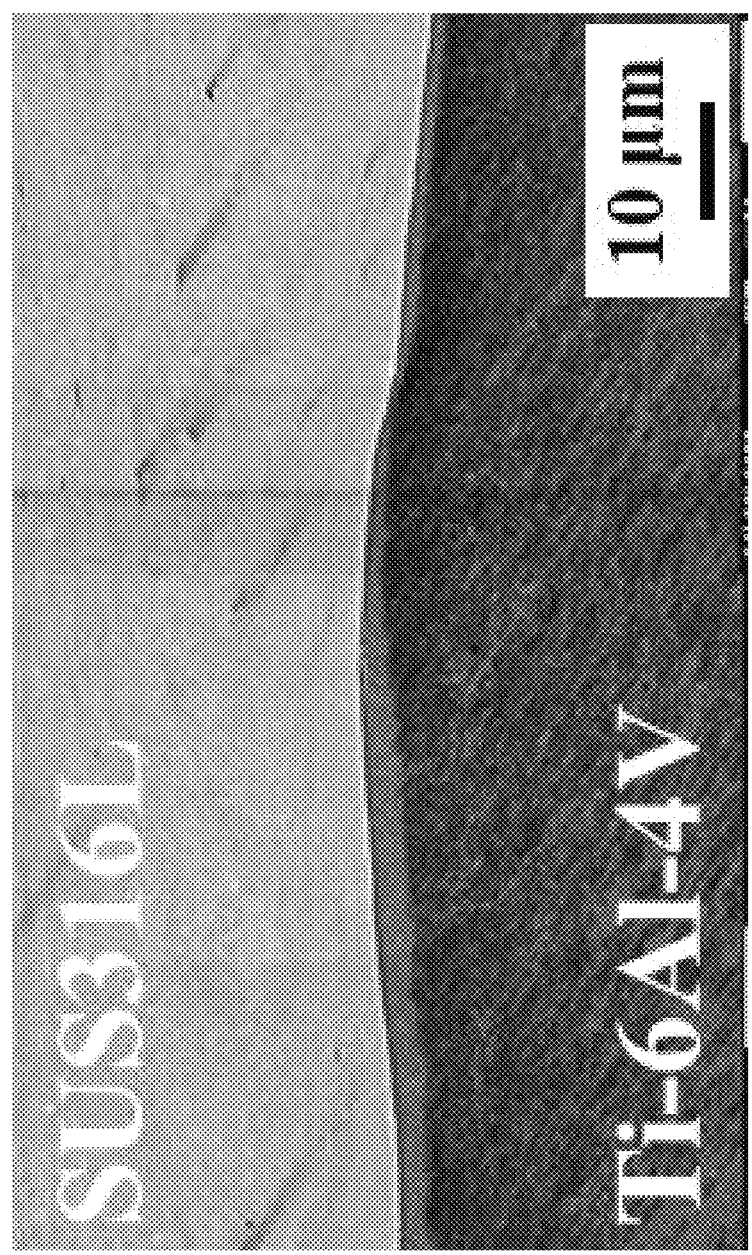
FIG. 10 is a SEM photograph of the center portion of the welded interface obtained under the present welding condition 1.
Figure 11:
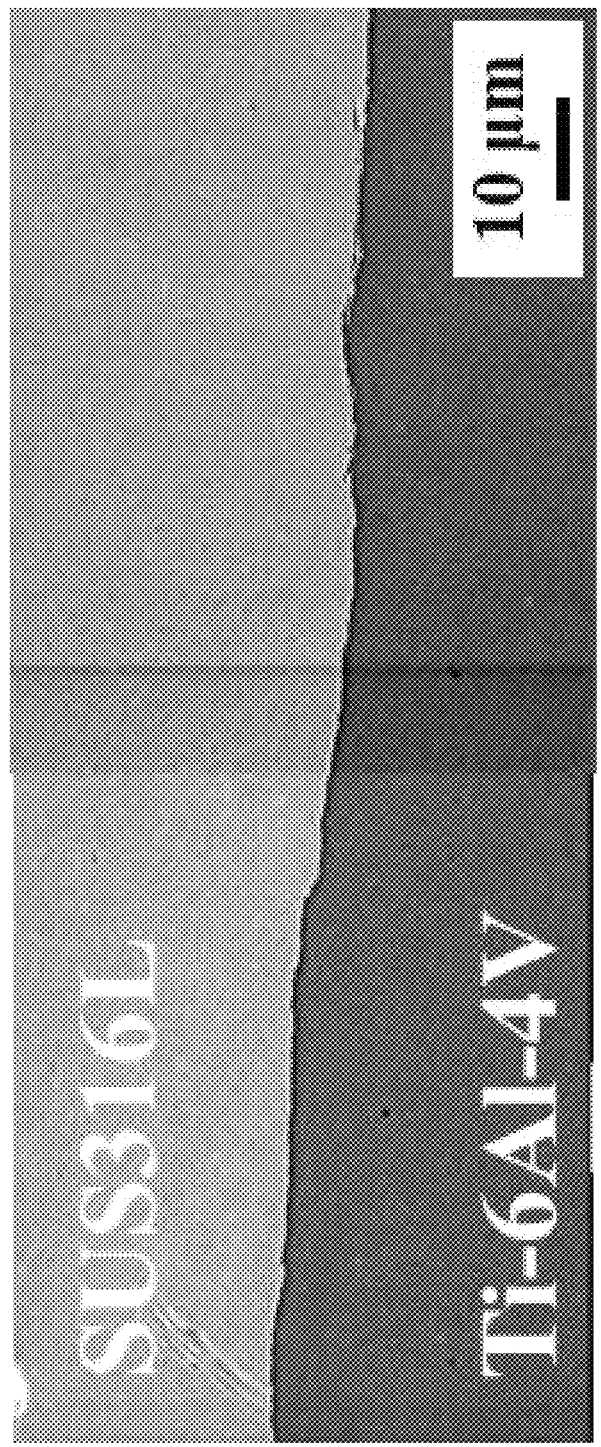
FIG. 11 is a SEM photograph of the outer peripheral portion of the welded interface obtained under the present welding condition 1.

FIG. 10 and FIG. 11 show the center portion and the outer peripheral portion of the welded interface obtained under the present welding condition 1, respectively. Since the welding temperature is high due to the low welding pressure of 400 MPa, there are areas where the thickness of the intermetallic compound layer is large, but no defect or mixed layer is observed.

Figure 12:
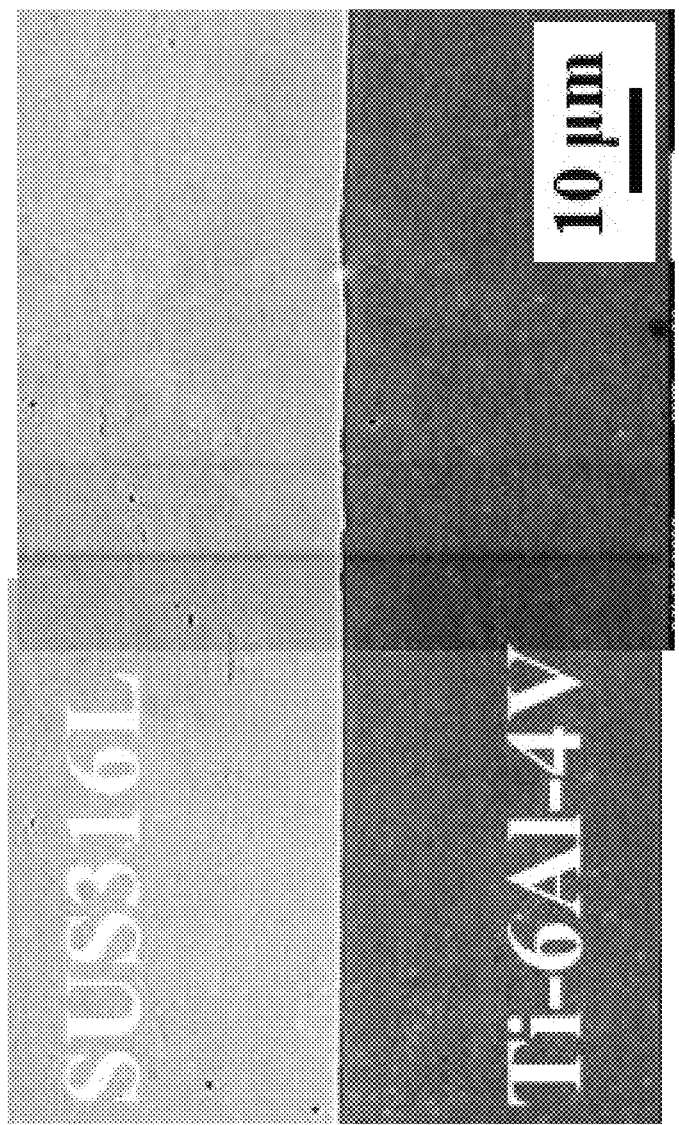
FIG. 12 is a SEM photograph of the center portion of the welded interface obtained under the present welding condition 3.
Figure 13:
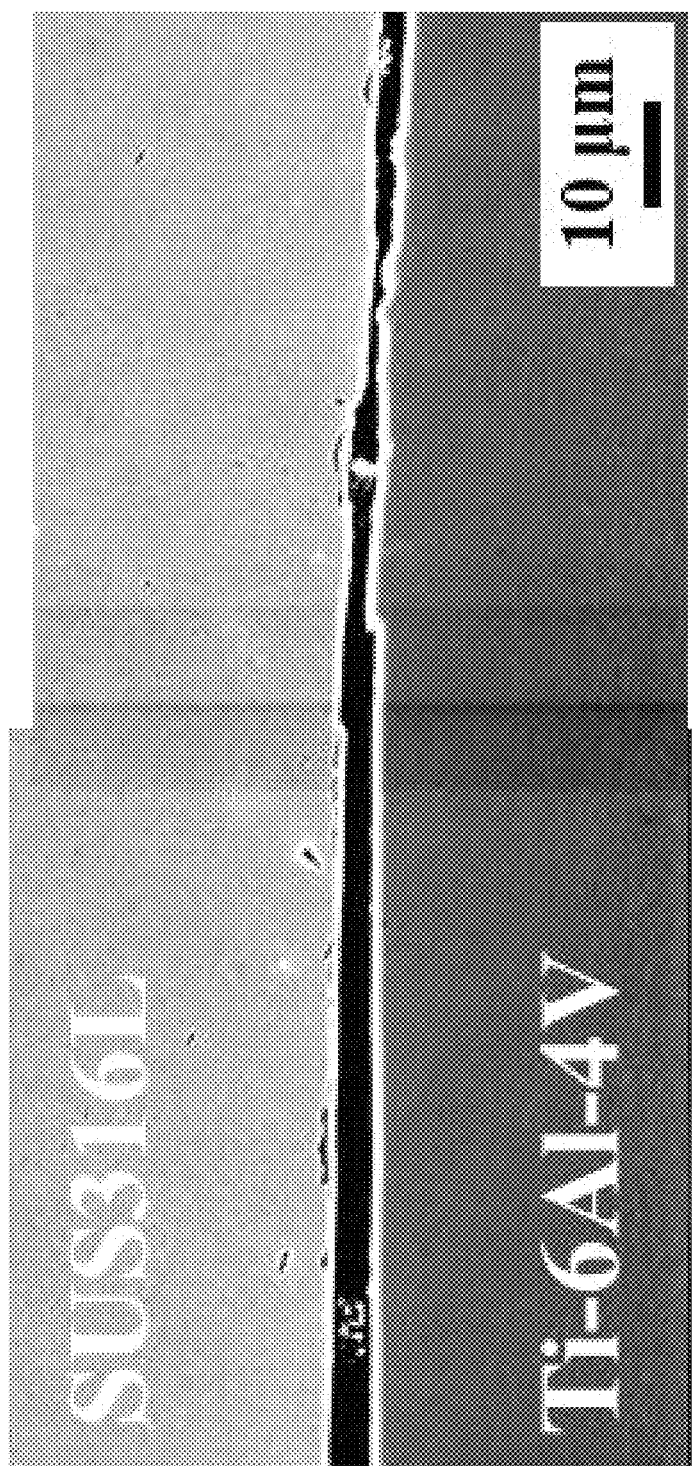
FIG. 13 is a SEM photograph of the outer peripheral portion of the welded interface obtained under the present welding condition 3.

FIG. 12 and FIG. 13 show the center portion and the outer peripheral portion of the welded interface obtained under the present welding condition 3, respectively. Since the welding temperature is low due to the high welding pressure of 500 MPa, the unwelded region is observed in the outer peripheral portion, but formation of thick intermetallic compound layer or mixed layer is not observed.

From the observation results of the welded interface shown in FIG. 8 to FIG. 13, it can be seen that setting the rotation speed (maximum sliding speed) to the extent so that the difference of the temperature histories between the center portion and the outer peripheral portion is made sufficiently low, controlling the welding temperature by the welding pressure and adjusting the temperature so that no unwelded region is formed, is an effective means for obtaining a good welded portion.

Figure 14:
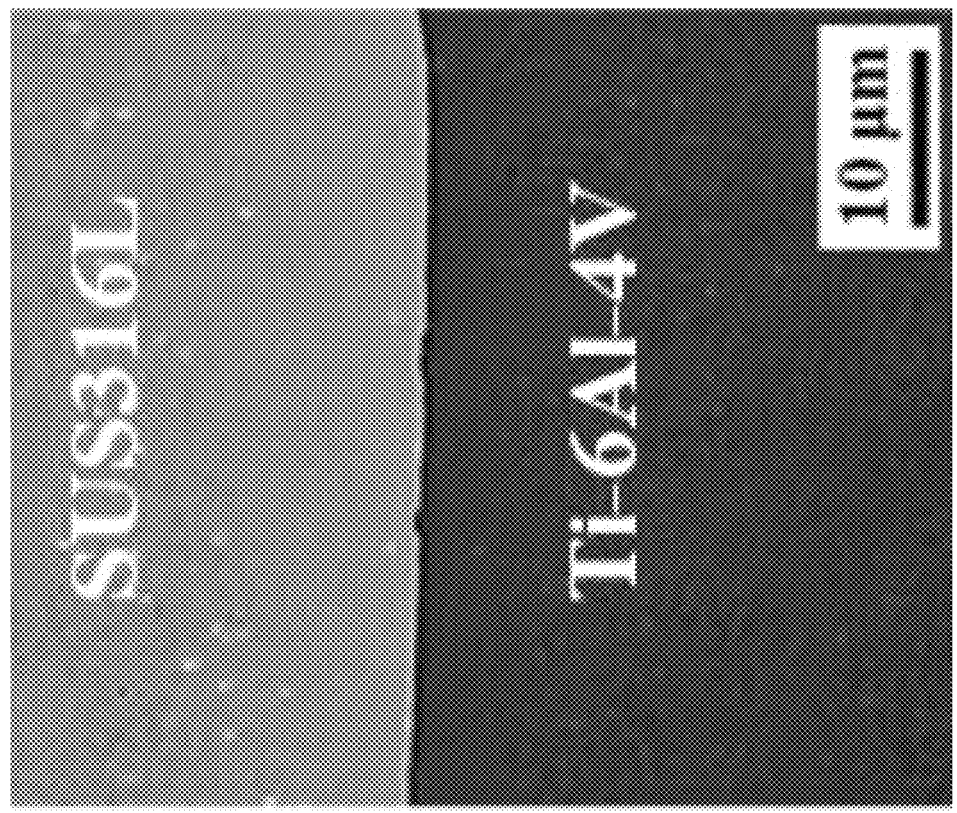
FIG. 14 is a SEM photograph of the center portion of the welded interface obtained under the present welding condition 4.
Figure 15:
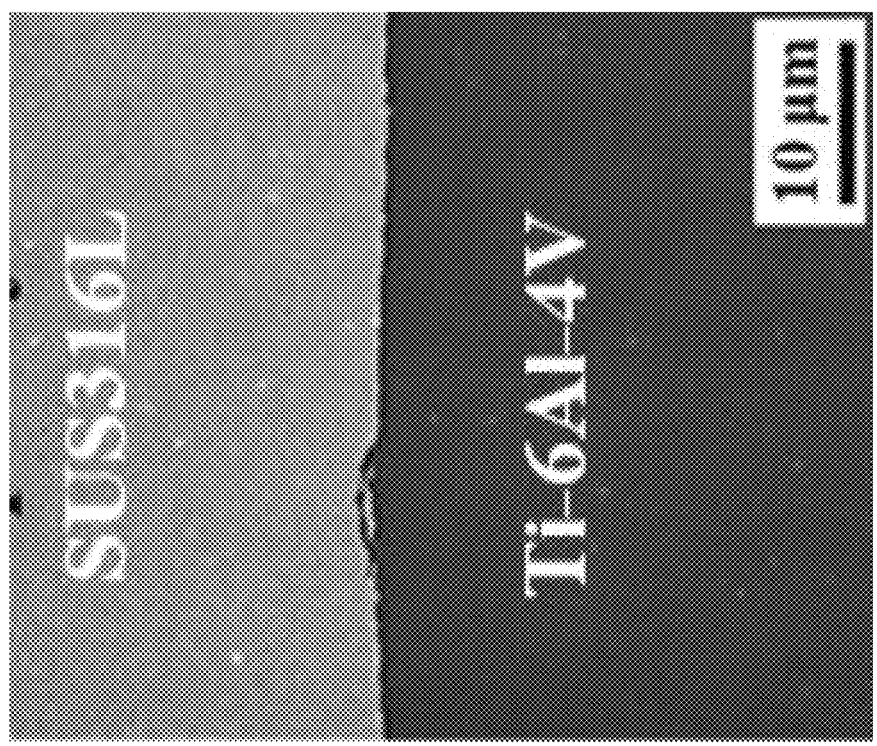
FIG. 15 is a SEM photograph of the outer peripheral portion of the welded interface obtained under the present welding condition 4.

FIG. 14 and FIG. 15 show the center portion and the outer peripheral portion of the welded interface obtained under the present welding condition 4, respectively. As in the case of the present welding condition 2, no defect or mixed layer was observed in the center portion and the outer peripheral portion, and a good welded interface with an extremely thin intermetallic compound layer having substantially the same thickness was obtained.

Figure 16:
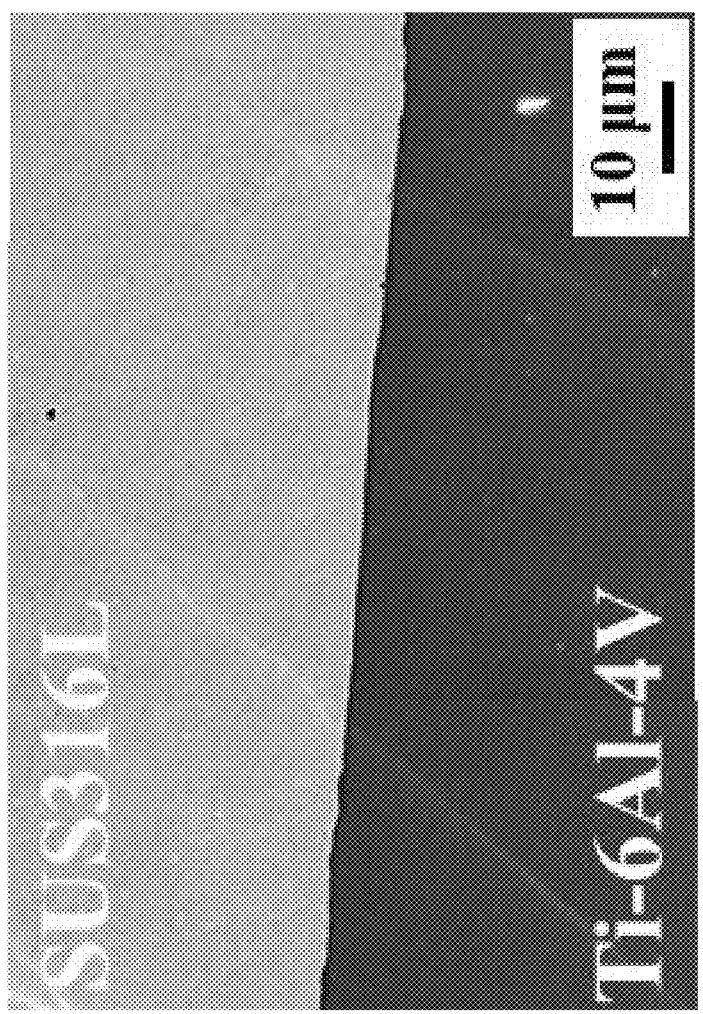
FIG. 16 is a SEM photograph of the center portion of the welded interface obtained under the present welding condition 5.
Figure 17:
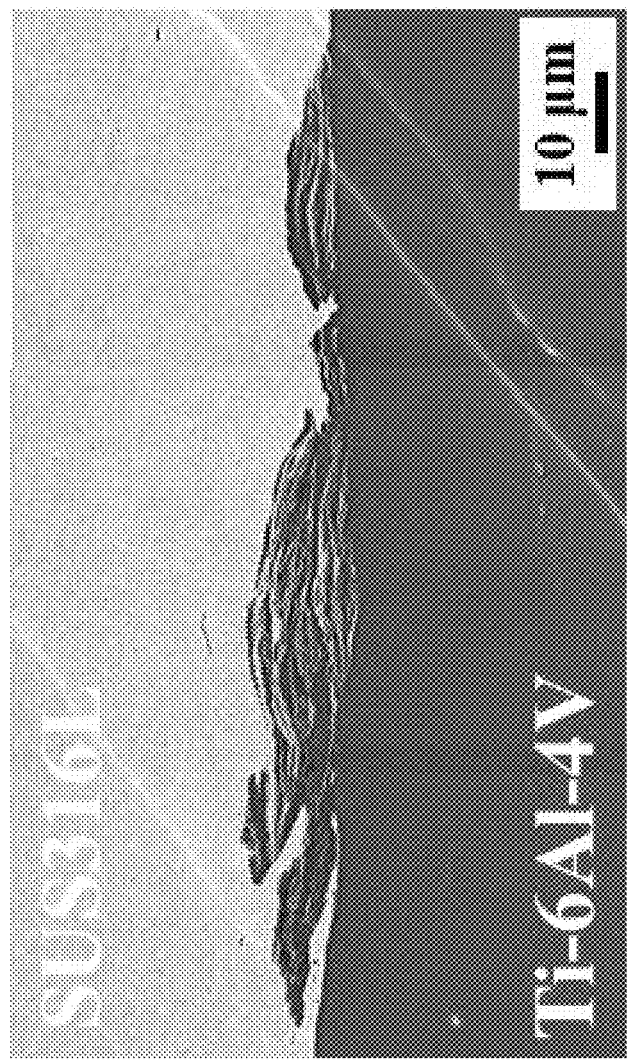
FIG. 17 is a SEM photograph of the outer peripheral portion of the welded interface obtained under the present welding condition 5.

FIG. 16 and FIG. 17 show the center portion and the outer peripheral portion of the welded interface obtained under the present welding condition 5, respectively. The difference in sliding speed between the center side and the outer peripheral side at the interface to be welded of the present welding condition 5 is larger than those of the present welding conditions 2 and the present welding condition 3, and although a mixed layer is formed slightly at the outer peripheral portion, no formation of defect and thick intermetallic compound layer is observed.

Figure 18:
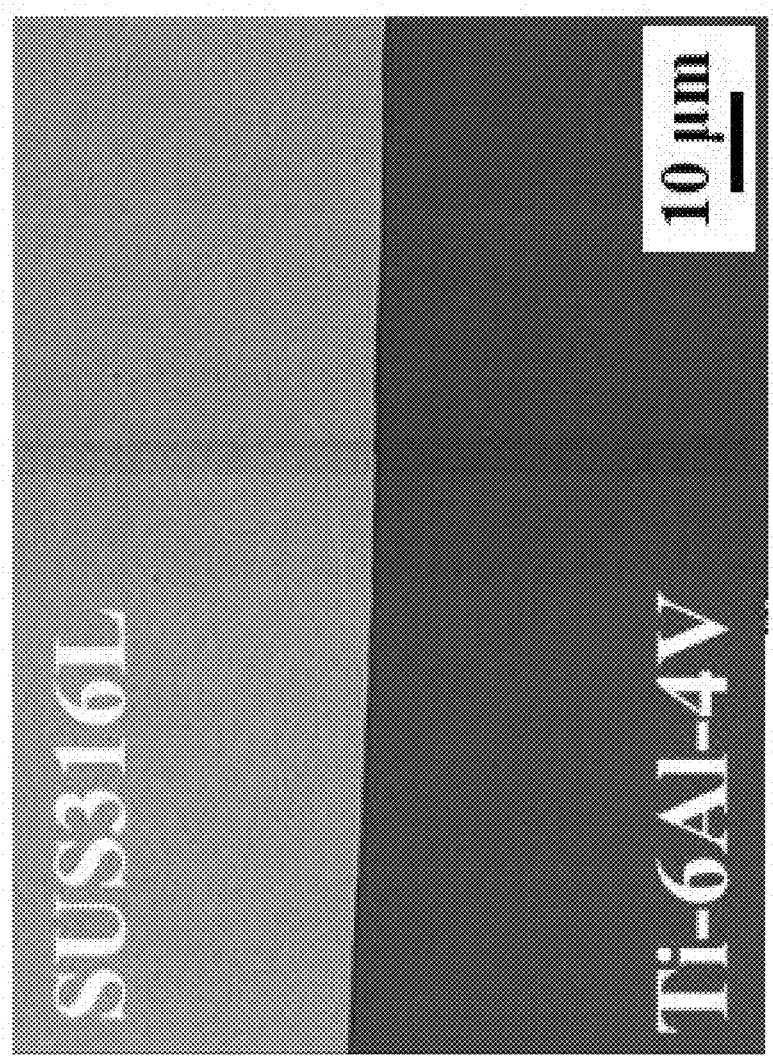
FIG. 18 is a SEM photograph of the center portion of the welded interface obtained under the comparative welding condition 2.
Figure 19:
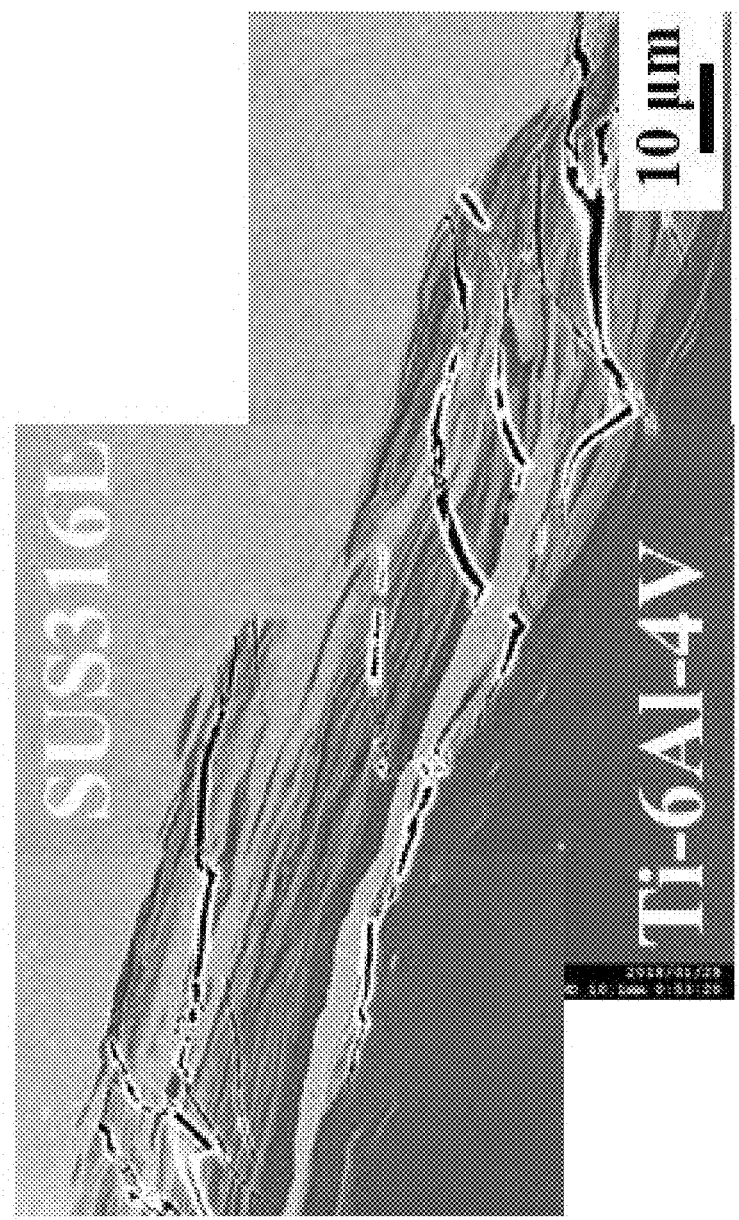
FIG. 19 is a SEM photograph of the outer peripheral portion of the welded interface obtained under the comparative welding condition 2.

FIG. 18 and FIG. 19 show the center portion and the outer peripheral portion of the welded interface obtained under the comparative welding condition 2, respectively. In the comparative welding condition 2, the rotational speed was as high as 300 rpm (maximum sliding speed: 157.08 mm/s), the difference in sliding speed and the maximum attained temperature between the center side and the outer peripheral side at the interface to be welded was large, and formation of the mixed layer is observed remarkably in the outer peripheral portion. In addition, streaky defects are also formed.

(3) STEM-EDS Analysis of Interface to be Welded

The STEM-EDS analysis was performed to understand in detail the state of the intermetallic compound layer at the interface to be welded.

A transmission electron microscope (JEM-2100F available from JEOL Ltd.) was used for the STEM-EDS analysis.

Figure 20:
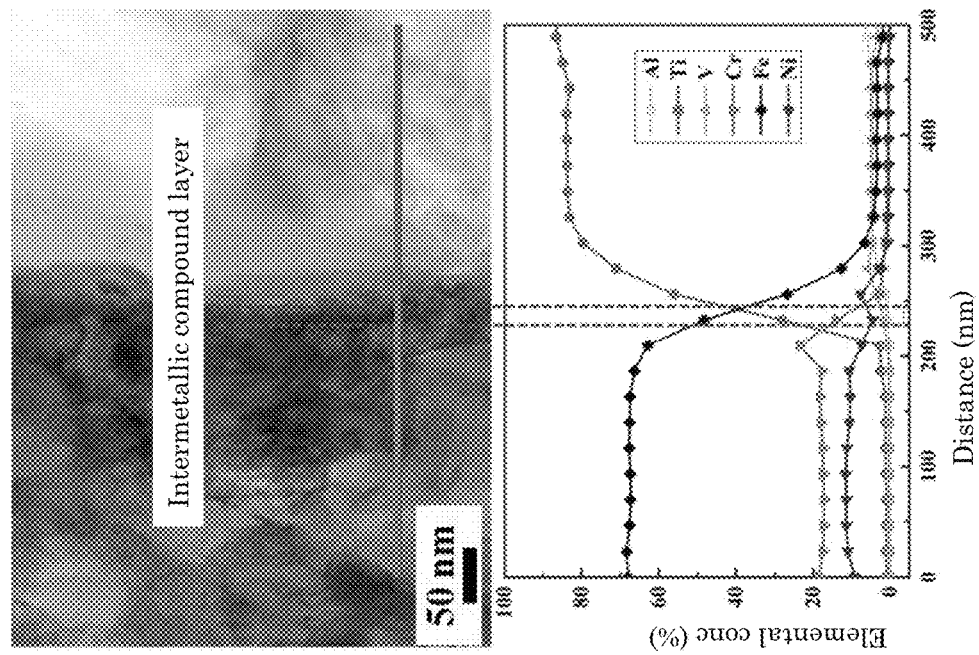
FIG. 20 is a STEM image of the center portion of the welded interface obtained under the present welding condition 1 and the line analysis result perpendicular to the welded interface.
Figure 21:
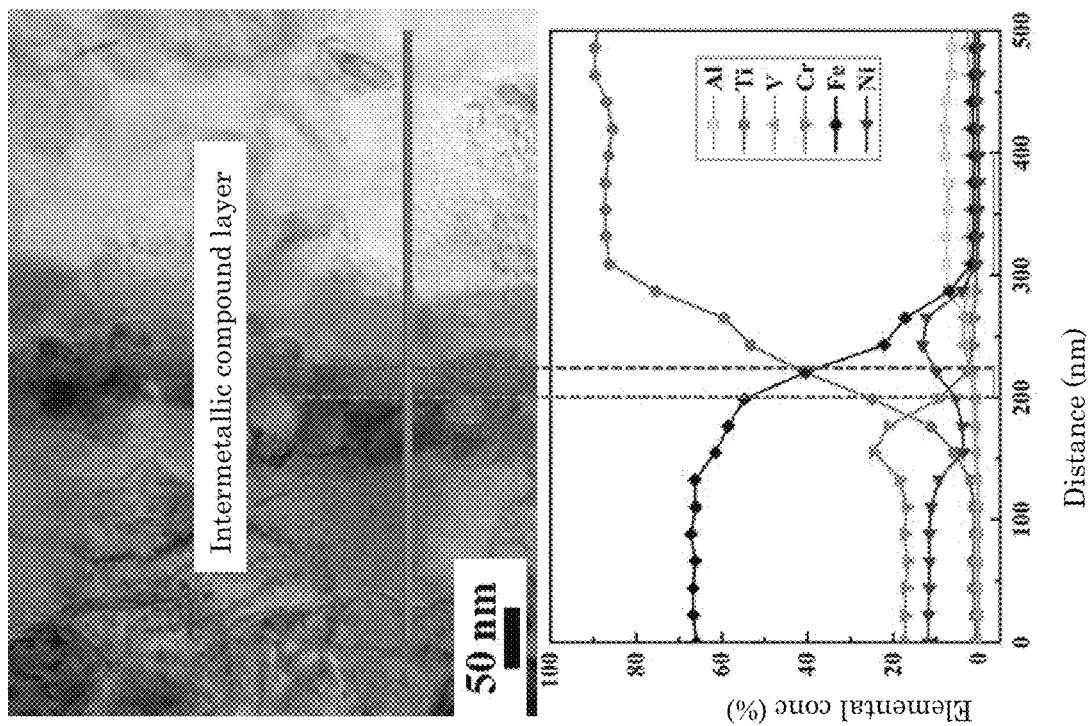
FIG. 21 is a STEM image of the outer peripheral portion of the welded interface obtained under the present welding condition 1 and the line analysis result perpendicular to the welded interface.
Figure 22:
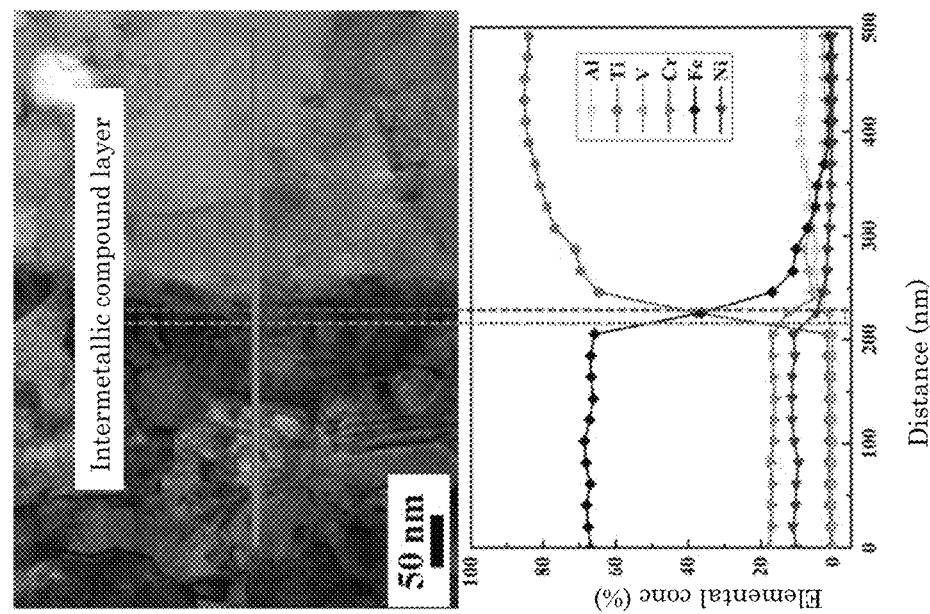
FIG. 22 is a STEM image of the center portion of the welded interface obtained under the present welding condition 2 and the line analysis result perpendicular to the welded interface.
Figure 23:
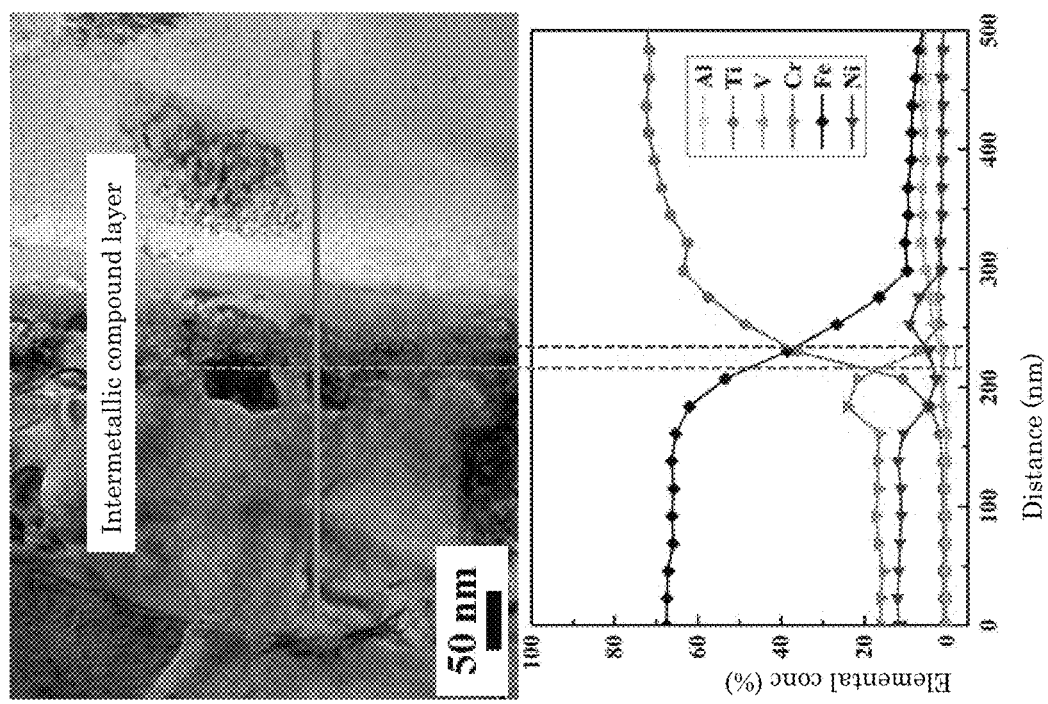
FIG. 23 is a STEM image of the outer peripheral portion of the welded interface obtained under the present welding condition 2 and the line analysis result perpendicular to the welded interface.

FIG. 20 and FIG. 21 show the STEM images of the center portion and the outer peripheral portion of the welded interface obtained under the present welding condition 1 and the results of line analysis perpendicular to the welded interface, respectively. Further, FIG. 22 and FIG. 23 show the STEM images of the center portion and the outer peripheral portion of the welded interface obtained under the present welding condition 2 and the results of line analysis perpendicular to the welded interface, respectively. The width of the presumed intermetallic compound layer is indicated by a dotted line, and it can be seen that the thickness is extremely thin of 50 nm or less in any case, and it can be seen that the center portion and the outer peripheral portion have almost the same thickness.

(4) Tensile Test

The obtained welded body was processed so that the parallel part had a length of 60 mm and a diameter of 9 mm to obtain a tensile test piece. With the removal of burrs, the diameter of the welded portion is 9 mm, which is slightly thinner, but almost of the welded interface is included in the tensile test piece. The tensile test conditions were a crosshead speed of 1 mm/min, and the measurement was performed by using Autograph AG-10 TB available from Shimadzu Corporation. The tensile test was performed three times under each welding condition, and the average value of the tensile strength was obtained.

The average tensile strength of the welded body obtained under the comparative welding condition 2 was 150 MPa. On the other hand, the average tensile strength of the welded body obtained under the present welding condition 5 was 300 MPa, which was approximately twice the value. Furthermore, the average tensile strength of the welded body obtained under the present welding condition 2 where the welding pressure was 450 MPa was 500 MPa, which is a high strength welded body that cannot be obtained by the existing welding method.

EXPLANATION OF SYMBOLS

2 . . . One member,
4 . . . Other member,
6 . . . Interface to be welded,
8 . . . Burr,
10 . . . Welded portion,
12 . . . Welded interface.

The invention claimed is:

1. A friction welding method in which one member is abutted against another member and is made to slide in a state in which a welding pressure substantially perpendicular to the interface to be welded is applied, the friction welding method being characterized in that
the maximum sliding speed is 53 mm/sec or less, the difference in the temperature rising rate between a center portion and an outer peripheral portion at the interface to be welded is within 10° C./sec, and the difference between the maximum attained temperatures between the center portion and the outer peripheral portion at the interface to be welded is within 50° C.

2. The friction welding method according to claim 1, wherein the maximum sliding speed is 21 mm/sec or less.

3. The friction welding method according to claim 1, wherein the welding pressure is set to be more than 300 MPa and the yield stresses of the one member and the other member at room temperature or less.

4. The friction welding method according to claim 1, wherein the one member and said other member have different compositions.

5. The friction welding method according to claim 1 wherein,
in a first friction welding, the defects are formed at the interface to be welded, and in a second friction welding after the first friction welding, the welding pressure is reduced as compared to the welding pressure in the first friction welding.

6. The friction welding method according to claim 1, wherein the diameter of the interface to be welded is 50 mm or less.

7. The friction welding method according to claim 1, wherein the one member is a titanium alloy material and said other member is steel material.

8. The friction welding method according to claim 1, wherein in a first friction welding, the intermetallic compound layer having a thickness of 1 μm or more is formed at the interface to be welded and/or the heat affected zone where the hardness is reduced by 10% or more compared to the base material is formed, and in a second friction welding after the first friction welding, the welding pressure is increased as compared to the welding pressure in the first friction welding.

9. A method for friction welding one member and another member, consisting of:
abutting the one member against the another member; and
sliding at least one of the one member or the another member in a state in which a constant welding pressure substantially perpendicular to the interface to be welded is applied,
wherein the maximum sliding speed is 53 mm/sec or less, the difference in the temperature rising rate between a center portion and an outer peripheral portion at the interface to be welded is within 10° C./sec, and the difference between the maximum attained temperatures between the center portion and the outer peripheral portion at the interface to be welded is within 50° C., and
one of the one member or the another member is a titanium alloy material and another one of the one member or the another member is steel material.

10. The method according to claim 9, wherein the maximum sliding speed is 21 mm/sec or less, and the diameter of the interface to be welded is 50 mm or less.

11. The method according to claim 9, wherein the maximum sliding speed is 41.89 mm/sec or less and the constant welding pressure is 400 MPa or more.

* * * * *